United States Patent [19]
Hui

[11] 3,829,593
[45] *Aug. 13, 1974

[54] CONTINUOUS PREPARATION OF PASTRY
[75] Inventor: In-Wai Hui, Kowloon, Hong Kong
[73] Assignee: Winner Food Products Limited, Kowloon, Hong Kong
[ * ] Notice: The portion of the term of this patent subsequent to Aug. 13, 1990, has been disclaimed.
[22] Filed: June 17, 1970
[21] Appl. No.: 46,890

[30] Foreign Application Priority Data
Feb. 24, 1970  Great Britain ............. 8865/70

[52] U.S. Cl. ............. 426/496, 426/517, 99/339, 99/423
[51] Int. Cl. ............. A21d 13/08
[58] Field of Search ........ 107/4 R, 4 A, 54 R, 54 B, 107/57 R, 57 A, 57 D, 60; 99/92, 339, 422, 423, 443; 426/496, 417

[56] References Cited
UNITED STATES PATENTS
| | | | |
|---|---|---|---|
| 1,399,149 | 12/1921 | Nuubson | 107/60 |
| 3,481,284 | 12/1969 | Cambanis | 107/4 R |
| 3,489,106 | 1/1970 | Lostanlen | 107/60 |
| 3,515,854 | 6/1970 | Williams | 107/57 R X |

Primary Examiner—Richard J. Scanlan, Jr.
Attorney, Agent, or Firm—Holman & Stern

[57] ABSTRACT

A film of farinaceous paste is applied to an endless travelling conveyor surface. The film of paste is heated to cook the paste at least partially to pastry. The cooked film is then removed from the conveyor surface.

23 Claims, 5 Drawing Figures

INVENTOR
HUI IN WAI

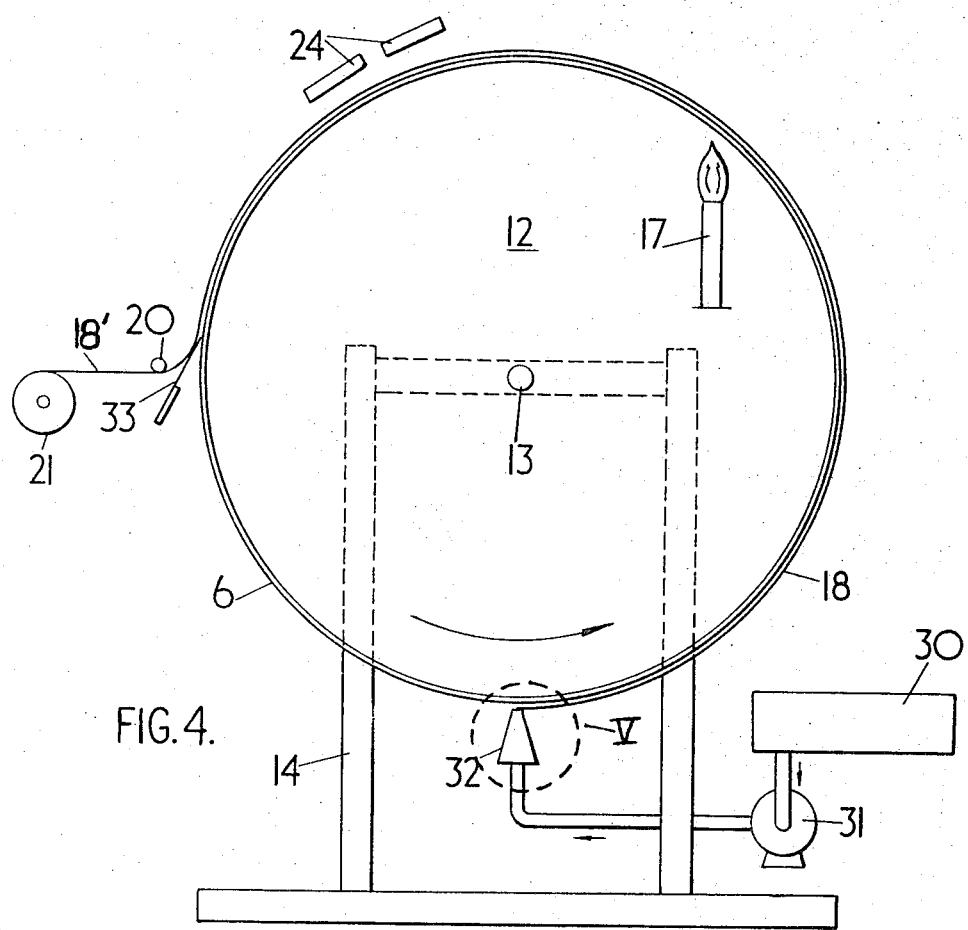
FIG. 4.
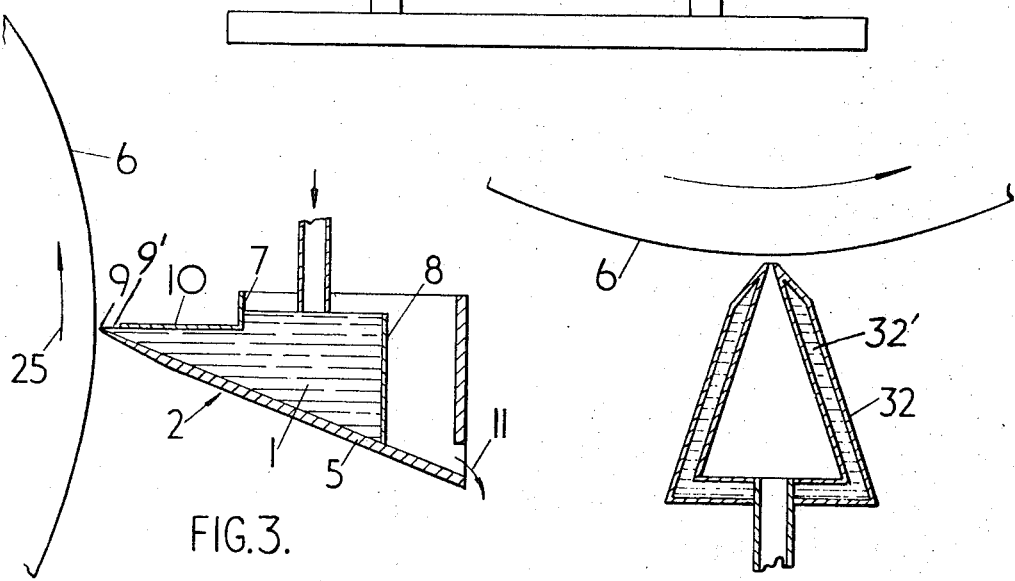
FIG. 3.
FIG. 5.
INVENTOR
HUI IN WAI

CONTINUOUS PREPARATION OF PASTRY

The invention relates to the continuous preparation of at least partially cooked pastry, in particular, but not solely, pastry for spring rolls.

"Spring Roll" is a Chinese "Tam Sum" which was originated a long time ago. It consists of pre-cooked bean sprouts, chopped chicken or pork, and mushrooms, and an outer pastry in the form of a wrap. The roll is then deep fried in oil until brown.

The outer wrap, or "spring roll" pastry, bought in the market, is round. It is conventionally produced by hand and is, therefore, rather uneven.

The invention resides in the at least partial cooking of a film of farinaceous paste during its continuous passage. Preferably, farinaceous paste applied to an endless travelling conveyor surface is heated at a point downstream of the zone of application, to at least partially cook it, before it is removed.

The invention provides apparatus for the continuous preparation of at least partially cooked pastry, comprising a substantially cylindrical drum mounted for rotation with its axis substantially horizontal, feed means for continuously applying a farinaceous paste to the external surface of the drum at a given position, and heating means within the drum for heating the drum at a position intermediate the feed means and a take-off point for the at least partly cooked pastry.

The invention also provides a process for the continuous preparation of at least partially cooked pastry, comprising continuously applying a farinaceous paste at a given position to the external surface of a substantially cylindrical drum rotating substantially continuously with its axis substantially horizontal, heating the drum at a position downstream of the position of application to at least partially cook the paste, and removing the at least partially cooked pastry from the drum.

The outer exposed surface of the paste may also be heated. An oil film may be applied to the external surface of the drum at a position upstream of the position of application, to prevent burning on of the paste and assist removal of the pastry.

The invention will be described further with reference to the accompanying drawings, which illustrate exemplary embodiments of the invention.

In the drawings:

FIG. 3 is a section through a nozzle detail on line III—III of FIG. 2, on an enlarged scale;

FIG. 4 is a schematic side elevation of another form of apparatus; and

FIG. 5 is a vertical section through a nozzle detail at V on FIG. 4, on an enlarged scale.

In all the trial runs, measured portions of flour and water and the minor ingredients were mixed and beaten with a mechanical beater until a smooth paste was formed. Lumps in the paste were undesirable as lumps would be found in the finished product.

One of the runs was made using "Sam Tor" brand flour of the Hong Kong Flour Mills with a weight analysis of:

| | |
|---|---|
| Moisture content | 12.5 – 13.0% |
| Protein content | 9.3 – 9.8% |
| Ash on combustion | 0.49 – 0.54% |

Other runs were made with "Pipe Brand" flour, imported from U.S.A. Flour protein content of above 13.5 percent raised the viscosity of the paste so that an undesirably thick pastry was formed. Final composition of the flour paste found to be satisfactory was:

| | |
|---|---|
| Wheat flour | 34.8% |
| Water | 64.8% |
| Sodium Borate | 0.4% |

The substitution of sodium carbonate or potassium hydroxide with sodium borate resulted in a lighter coloured product.

Figure 1:
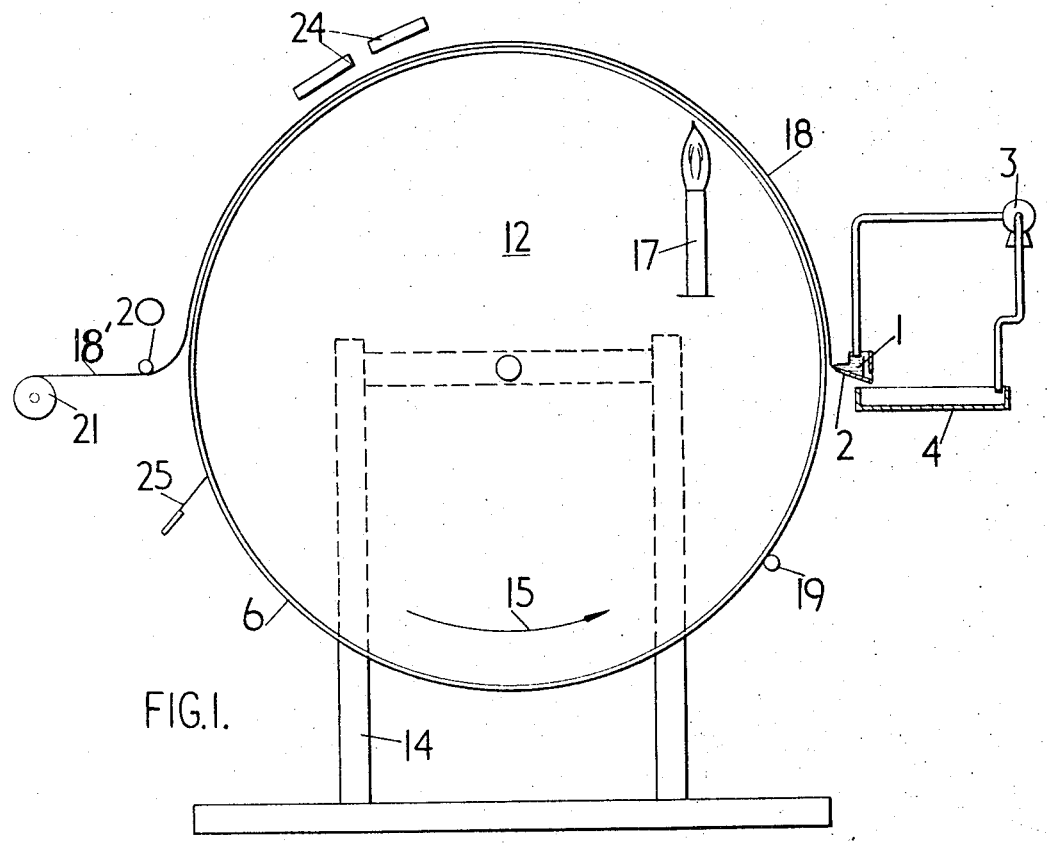
FIG. 1 is a schematic side elevation of apparatus for preparing partly cooked pastry, in use.
Figure 2:
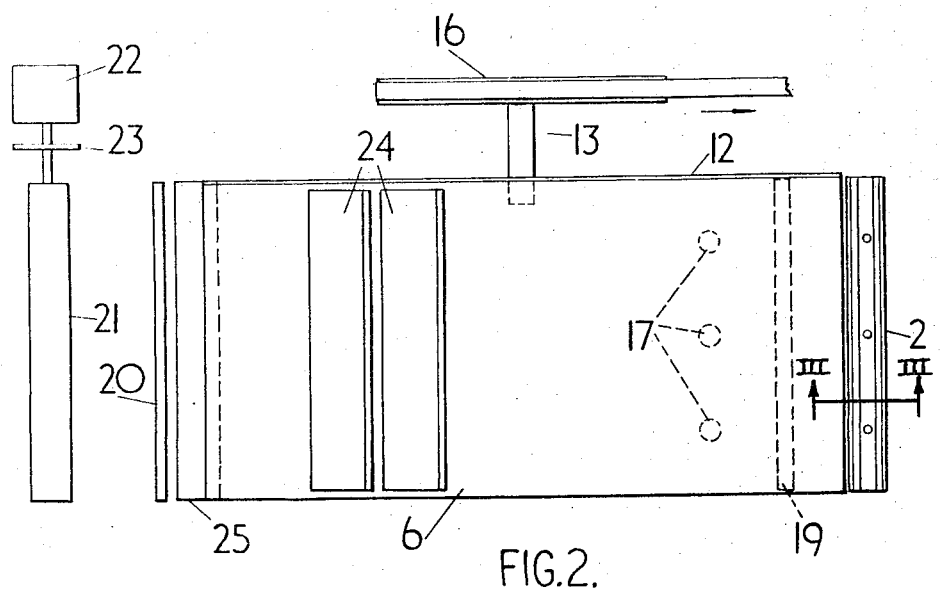
FIG. 2 is a schematic plan view of the apparatus of FIG. 1, the support being omitted.

Referring to FIGS. 1 to 3, flour paste 1 is supplied to a trough 2 by a pump 3 from a reservoir 4. The trough 2 has a sloping base 5 terminating in a sharp edge 9 adjacent the surface of a cylindrical drum 6. Vertical baffles 7, 8 define a constant head above the edge 9 to provide a constant flow of paste through a longitudinal orifice 9' defined between the edge 9 and a horizontal baffle 10. Paste flowing over the baffle 8 returns to the reservoir 4 as indicated by the arrow 11.

The drum 6 is closed by a circular plate 12 rigid with an axial shaft 13 rotatably mounted on a support structure 14. The drum 6 is rotated slowly in the direction indicated by the arrows 15 by a belt drive acting on a pulley 16 on the shaft 13.

Three low-pressure adjustable gas-burners 17 arranged within the drum 6 heat an area of the drum, and the film of flour paste 18 travelling with the drum is partly cooked. The film 18 also passes below two 1kW electric heaters 24 which dry the surface of the film 18 and aid cooking. The surface of the drum 6 is continuously oiled by a felt roller 19 supplied with vegetable oil. This prevents burning on of the paste film 18 and enables the pastry to be wound off the drum 6 without the use of a knife-edge scraper. The pastry strip 18' is wound off under a tensioning roller 20 onto a roller 21 driven at constant torque by a variable speed motor 22 via a clutch 23. The drum 6 is cleaned by a scraper 25. Satisfactory results have been obtained with a drum 6 of diameter 22 inches and width 12 inches of welded ⅜ inch rolled steel plate. The drum 6 was driven by a motor and reduction gear at 1 r.p.m. and a clearance between the drum and trough edge 9 of 1 mm was maintained.

During the early stage of development, a closed, horizontal nozzle which runs the width of the roll was used. It was later found that such a design induces clogging. Though clogging of the nozzle could be overcome by exerting high pressure on the solution, the trough was found to eliminate all these difficulties. The material of construction for the nozzle is steel. Copper or stainless steel are also suitable.

The production of a continuous film of "spring roll" pastry is feasible with this apparatus. With flour concentration of 34.8 percent a pastry film thickness of 0.3 mm was obtained. Higher flour concentration of higher protein content in the flour will result in a thicker pastry film.

Approximately 73 percent of the water in the flour paste evaporated during the process.

The capacity of the machine is approximately 12 lbs. of finished product (10 inches wide) per hour.

The capacity of the machine could be increased by increasing the speed of the drum, when the corresponding number of heating elements should be increased; or by constructing a wider drum; or by taking both steps together.

FIGS. 4 and 5 show an alternative embodiment, which differs in the application and removal of the paste. Paste flour from a reservoir 30 is supplied under pressure, via a pump 31, to a longitudinal nozzle 32 opening adjacent the surface of the drum 6, and forms a film of paste 18 adhering to the drum. The film 18 is again cooked by the burners 17 and dried by the heaters 24. The pastry film 18' is detached from the drum 6 by a knife-edge scraper 33 before being wound on the roller 21.

A higher pressure has to be applied to the paste in the nozzle 32 than in the trough 2 (FIGS. 1, 3), but the concentration of flour can be increased up to 50 percent. The nozzle 32 has to be cleaned with a scraper periodically to prevent clogging and cooling of the nozzle with a water jacket 32' is desirable.

The advantage of the automatic machines described above is that they save labour, are more economical, have a higher capacity, and result in a more uniform product having a form that is easier to work with, as compared with manual processes.

I claim:

1. A process for the continuous preparation of at least partially cooked pastry, comprising the steps of: pumping a farinaceous paste at a substantially constant rate through a nozzle having an elongated discharge opening adjacent the outer curved surface of a substantially cylindrical drum mounted for rotation with its axis substantially horizontal with the discharge opening lying transversely of said surface; rotating the drum at a substantially constant rate so that a film of paste is applied to said surface by the nozzle; heating the film of paste to at least partially cook it to paste; and continuously removing the film of at least partially cooked pastry from the surface.

2. A process as claimed in claim 1, further comprising cooling the nozzle.

3. A process as claimed in claim 1, wherein the film of paste is applied to said surface at a point below the level of the axis of the drum.

4. A process as claimed in claim 3, wherein said point of application is substantially at the bottom of the drum.

5. A process as claimed in claim 1, wherein the paste contains from about 34.8 to 50 percent wheat flour, by weight.

6. A process as claimed in claim 1, wherein the heating step comprises heating the internal surface of the drum, whereby heat is transferred to the farinaceous paste via the drum.

7. A process as claimed in claim 1, further comprising directly heating the outer exposed surface of the film of farinaceous paste by radiation.

8. A process as claimed in claim 1, including applying an oil film to said drum surface prior to the paste application step.

9. A process for continuously producing a preparation of an at least partially cooked pastry as a continuous web in the production of pastry wrappers used to preparing "spring roll" type pastry foods or the like comprising the steps of:

A. preparing a farinaceous paste;
B. applying at a constant pressure, rate and thickness the farinaceous paste as a single wide film transversely onto the downstream curved portion of an endless conveyor moved at a substantially constant speed on a substantially horizontal axis of rotation;
C. applying heat to said endless conveyor upstream of the curved portion to which the wide farinaceous film is applied sufficient to at least partially cook the farinaceous sheet as it moves upwardly; and
D. continuously removing the at least partially cooked sheet as a continuous web further upstream and intermediate the path of a complete rotation of said endless conveyor.

10. The process as claimed in claim 9, including maintaining the pressure on said farinaceous paste by substantially continuously pumping the same through a nozzle having an outlet opening immediately adjacent the curved portion to which it is applied through a slot extending substantially the width of said endless conveyor.

11. The process as claimed in claim 10, including the step of cooling said nozzle for preventing precooking of the farinaceous paste before it is applied to said endless conveyor and post-cooking after it is no longer applied.

12. The process as claimed in claim 10, including applying the heat both internally of said endless conveyor and externally thereof from fixed positions relative to the path of movement of said endless conveyor intermediate the portions thereof where the film is applied and the web is removed.

13. The process as claimed in claim 9, including applying said film on said endless conveyor at a position substantially level with the axis of rotation of said endless conveyor as the conveyor portion moves upwardly therefrom.

14. The process as claimed in claim 9 in which said film is applied substantially at the lowermost portion of the path of rotation of said endless conveyor for providing a substantially long cooking path for said film.

15. The process as claimed in claim 9 in which said farinaceous paste is prepared as a mixture including from about 34.8 to 50 percent wheat flour, by weight.

16. Apparatus for the continuous preparation of at least partially cooked pastry, comprising a substantially cylindrical drum mounted for rotation with its axis substantially horizontal; drive means for rotating the drum at a substantially constant rate; a nozzle having an elongate discharge opening adjacent the outer curved surface of the drum, the discharge opening lying transversely of said surface; a pump for feeding a farinaceous paste through the nozzle at a substantially constant rate to apply a film of farinaceous paste to said drum surface; means for heating the film so that the paste is at least partially cooked to pastry; and means for continuously removing the film of at least partially cooked pastry from said drum surface.

17. Apparatus as claimed in claim 16, wherein the nozzle has a jacket for a cooling liquid.

18. Apparatus as claimed in claim 16, wherein the nozzle lies below the level of the axis of the drum.

19. Apparatus as claimed in claim 18, wherein the nozzle is substantially at the bottom of the drum.

20. Apparatus as claimed in claim 16, wherein the heating means comprise a heat source for supplying heat directly to the internal surface of the drum, whereby heat is transferred to the farinaceous paste via the drum.

21. Apparatus as claimed in claim 16, further comprising a radiant heat source for supplying heat directly to the exposed surface of the film of farinaceous paste.

22. Apparatus as claimed in claim 16, including means for applying an oil film to the external drum surface.

23. Apparatus as claimed in claim 16, wherein the film removal means comprises a take-up roller and means for rotating the take-up roller.

* * * * *